(12) United States Patent
Watanabe et al.

(10) Patent No.: US 11,110,979 B2
(45) Date of Patent: Sep. 7, 2021

(54) AUTOMOBILE MANUFACTURING METHOD

(71) Applicant: TOYOTA JIDOSHA KABUSHIKI KAISHA, Toyota (JP)

(72) Inventors: Yoshihiko Watanabe, Toyota (JP); Yuji Nabeshima, Ama (JP); Koji Kawasaka, Ohbu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 16/676,731

(22) Filed: Nov. 7, 2019

(65) Prior Publication Data

US 2020/0198714 A1 Jun. 25, 2020

(30) Foreign Application Priority Data

Dec. 20, 2018 (JP) .............................. JP2018-237976

(51) Int. Cl.
 *B62D 65/18* (2006.01)
 *B62D 65/00* (2006.01)
 (Continued)

(52) U.S. Cl.
 CPC ........... *B62D 65/18* (2013.01); *B62D 65/005* (2013.01); *B62D 65/024* (2013.01); *G05D 1/021* (2013.01)

(58) Field of Classification Search
 CPC .... B62D 65/18; B62D 65/005; B62D 65/024; B62D 65/00; G05D 1/021; Y02P 90/02; G05B 2219/2637; G05B 2219/45055; G05B 2219/31054; G05B 19/41805; B60W 30/165
 See application file for complete search history.

(56) References Cited

U.S. PATENT DOCUMENTS 9,434,432 B2 * 9/2016 Grevener ............... B62D 65/12
10,336,384 B2 * 7/2019 Nordbruch ............ G06Q 50/04
(Continued)

FOREIGN PATENT DOCUMENTS

DE 102017106731 A1 10/2018
JP 2001-216021 A 8/2001
(Continued)

*Primary Examiner* — Ryan J. Walters
(74) *Attorney, Agent, or Firm* — Sughrue Mion, PLLC (57) ABSTRACT

Provided is a method of manufacturing an automobile capable of automatic driving while recognizing and following a vehicle ahead. The method includes a first installation step of installing the following in a target vehicle-being-manufactured to make the target vehicle-being-manufactured capable of automatic driving: traveling parts including a tire and a wheel; a drive source that drives the wheel; a power supply device that supplies a power source for operating the drive source; a sensor that recognizes a vehicle ahead; and a controller that controls the drive source based on information acquired from the sensor such that the target vehicle-being-manufactured runs so as to follow the vehicle ahead, and a second installation step of, after the first installation step, installing an interior part in the target vehicle-being-manufactured while moving the target vehicle-being-manufactured by automatic driving so as to follow a vehicle-being-manufactured ahead of and adjacent to the target vehicle-being-manufactured.

13 Claims, 5 Drawing Sheets

(51) Int. Cl.
    *B62D 65/02*     (2006.01)
    *G05D 1/02*     (2020.01)

(56) References Cited

U.S. PATENT DOCUMENTS

| | | | |
|---|---|---|---|
| 2016/0304124 A1 | 10/2016 | Fujiyoshi et al. | |
| 2017/0320529 A1 | 11/2017 | Nordbruch | |
| 2018/0276595 A1* | 9/2018 | Gariepy | G06Q 10/06313 |
| 2020/0156722 A1* | 5/2020 | Watkins | G06Q 10/08 |

FOREIGN PATENT DOCUMENTS

| | | |
|---|---|---|
| JP | 2013-035321 A | 2/2013 |
| JP | 2016-203718 A | 12/2016 |
| JP | 2017-538619 A | 12/2017 |
| KR | 10-2017-0053843 A | 5/2017 |

\* cited by examiner

COMPARATIVE EXAMPLE

AUTOMOBILE MANUFACTURING METHOD

INCORPORATION BY REFERENCE

The disclosure of Japanese Patent Application No. 2018-237976 filed on Dec. 20, 2018 including the specification, drawings and abstract is incorporated herein by reference in its entirety.

BACKGROUND

1. Technical Field

The present disclosure relates to an automobile manufacturing method.

2. Description of Related Art

There is a known automobile manufacturing line on which parts are installed in a vehicle while the vehicle is placed on and transferred by a trolley capable of self-driving, instead of being transferred by a conveyor, for example, as disclosed in Japanese Patent Application Publication No. 2013-035321 (JP 2013-035321 A). Here, the trolley capable of self-driving is called, for example, an automated guided vehicle (AGV).

SUMMARY

The present inventors have found that the above automobile manufacturing method has the following drawback: While the automobile manufacturing method as disclosed in JP 2013-035321 A can eliminate the need for a conveyor used to transfer vehicles, it requires a large number of trolleys capable of having a vehicle placed thereon and self-driving, which makes it difficult to reduce the manufacturing facility cost.

The present disclosure provides an automobile manufacturing method that can reduce the manufacturing facility cost.

An automobile manufacturing method according to an aspect of the present disclosure is a method of manufacturing an automobile capable of automatic driving while recognizing and following a vehicle ahead. This method includes a first installation step of installing the following in a target vehicle-being-manufactured to make the target vehicle-being-manufactured capable of automatic driving: traveling parts including a tire and a wheel; a drive source that drives the wheel; a power supply device that supplies a power source for operating the drive source; a sensor that recognizes a vehicle ahead; and a controller that controls the drive source based on information acquired from the sensor such that the target vehicle-being-manufactured runs so as to follow the vehicle ahead, and a second installation step of, after the first installation step, installing an interior part in the target vehicle-being-manufactured while moving the target vehicle-being-manufactured by automatic driving so as to follow a vehicle-being-manufactured ahead of and adjacent to the target vehicle-being-manufactured.

The automobile manufacturing method according to this aspect of the present disclosure involves, in the first installation step, installing the parts for making the target vehicle-being-manufactured capable of automatic driving, and in the second installation step, installing the interior part in the target vehicle-being-manufactured while moving the target vehicle-being-manufactured by automatic driving so as to follow a vehicle-being-manufactured ahead of and adjacent to the target vehicle-being-manufactured. Thus, the need for a conveyor or a trolley used to transfer a vehicle-being-manufactured on the line for the second installation step can be eliminated, which translates into a reduction in the manufacturing facility cost.

The above automobile manufacturing method may further include a step of moving the target vehicle-being-manufactured by manual driving after the second installation step. When a defect occurs in the target vehicle-being-manufactured during the second installation step, the target vehicle-being-manufactured needs to be moved out of the manufacturing line. Since this method further includes the step of moving the target vehicle-being-manufactured by manual driving, a vehicle-being-manufactured behind the target vehicle-being-manufactured can be prevented from moving out of the manufacturing line by following the target vehicle-being-manufactured.

The above automobile manufacturing method may further include an inspection step of inspecting a completed vehicle of the target vehicle-being-manufactured after the second installation step. The target vehicle-being-manufactured may be moved by manual driving in the inspection step, and when a defect occurs in the target vehicle-being-manufactured during the second installation step, the target vehicle-being-manufactured may be continuously moved to the inspection step by automatic driving, and then the target vehicle-being-manufactured may be moved out of a line for the inspection step by manual driving before being inspected. Thus, in the inspection step in which the target vehicle-being-manufactured is moved by manual driving, the target vehicle-being-manufactured is moved out of the line for the inspection step, so that a vehicle-being-manufactured behind the target vehicle-being-manufactured can be prevented from moving out of the line for the inspection step by following the target vehicle-being-manufactured.

The controller may have a plurality of automatic following driving modes including a first mode in which the target vehicle-being-manufactured is controlled so as to follow the vehicle-being-manufactured in the second installation step, and a second mode in which the completed vehicle is controlled so as to follow a vehicle ahead. The controller may prohibit transition to the first mode and maintain a prohibited state in which transition to the first mode is prohibited, from a point in time after the second installation step and before shipment of the completed vehicle. For example, the controller may prohibit transition to the first mode and maintain the prohibited state from a point in time during the inspection step. Thus, a shipped vehicle can be reliably prevented from transitioning to the first mode during manual driving on the road.

The controller may prohibit transition to the first mode and maintain the prohibited state when an amount of operation of at least one of a steering wheel, an accelerator pedal, and a brake pedal has exceeded a reference value. Thus, transition to the first mode can be easily prevented.

An amount of information acquired from the sensor may be smaller in the first mode than in the second mode. Thus, the amount of work such as calibration of the sensor can be reduced.

To stop an operation for the second installation step, a vehicle-being-manufactured located at an end of a line for the second installation step may be stopped by a crossing gate provided at the end of the line for the second installation step. Thus, it is possible to stop the entire line for the second installation step without stopping the inspection step, as well as to easily resume automatic following driving in the second installation step.

The traveling parts, the drive source, the power supply device, the sensor, and the controller to be installed in the target vehicle-being-manufactured in the first installation step may be assembled into a module in advance. Thus, the time required for installation can be reduced compared with when these parts are sequentially installed in a body while the body is transferred. Moreover, the need for a conveyor used to transfer a body can be eliminated, and the line for the first installation step itself can be omitted.

The drive source may be a motor and the power supply device may be a battery. Thus, no exhaust gas is emitted during automatic following driving in the second installation step, and the need for an exhaust gas removing device can be eliminated, which translates into a further reduction in the manufacturing facility cost compared with when the drive source is an engine.

In the second installation step, a central managing unit may control movement of the vehicle-being-manufactured by performing wireless communication with the vehicle-being-manufactured. Movement of each vehicle-being-manufactured can be controlled by the central managing unit.

The present disclosure can provide an automobile manufacturing method that can reduce the manufacturing facility cost.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Specific embodiments to which the present disclosure is applied will be described below in detail with reference to the drawings. The present disclosure is not limited to the following embodiments. For clear illustration, the following description and the drawings are simplified as appropriate.

First Embodiment

Figure 1:
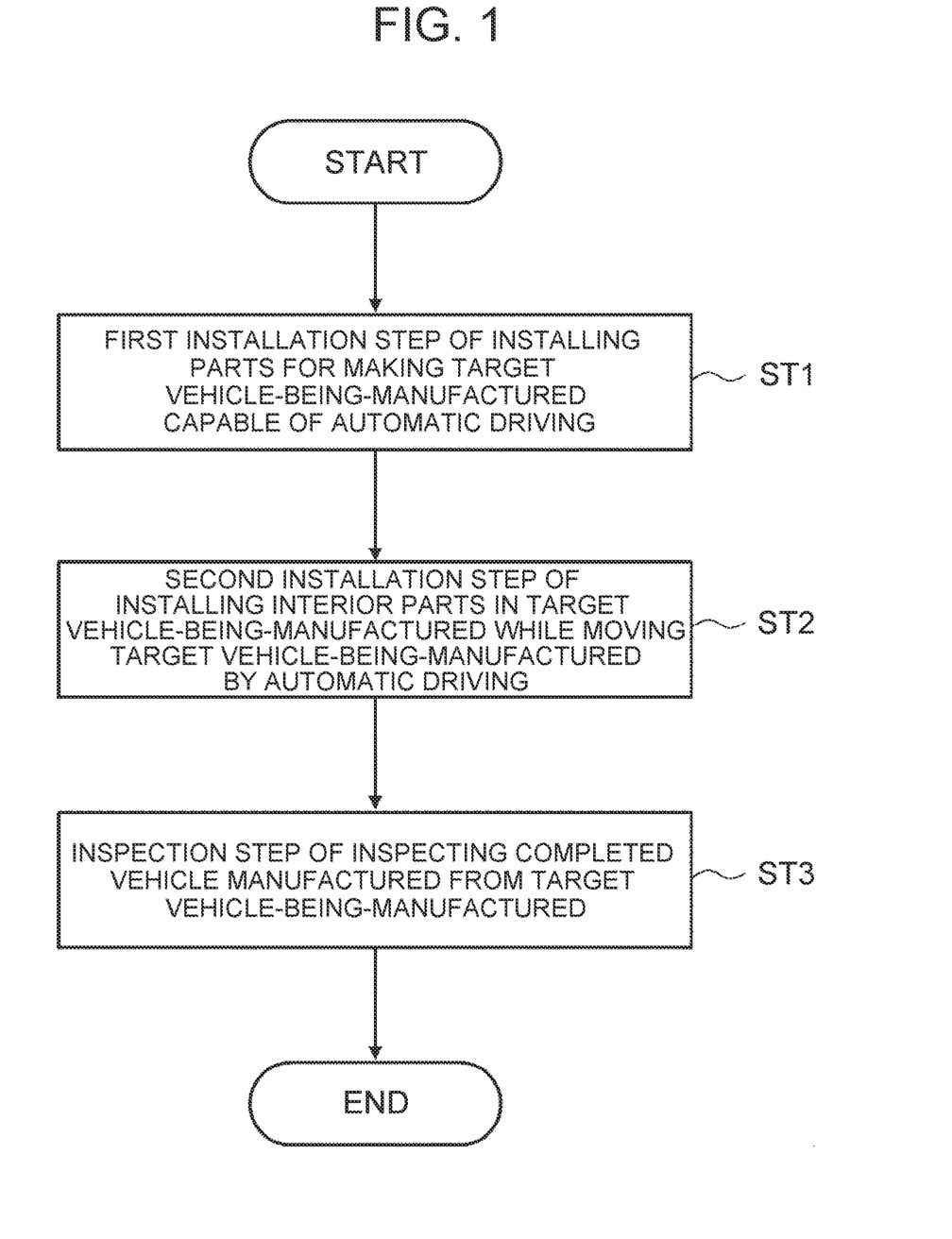
FIG. 1 is a flowchart showing an automobile manufacturing method according to a first embodiment.
Figure 2:
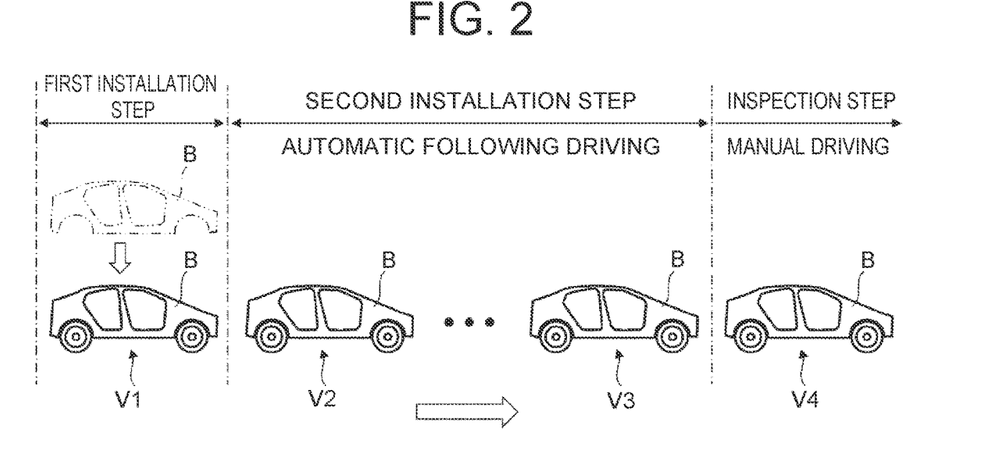
FIG. 2 is a schematic side view showing the automobile manufacturing method according to the first embodiment.

First, an automobile manufacturing method according to a first embodiment will be described with reference to FIG. 1 and FIG. 2. FIG. 1 is a flowchart showing the automobile manufacturing method according to the first embodiment. FIG. 2 is a schematic side view showing the automobile manufacturing method according to the first embodiment. The automobile manufacturing method according to the first embodiment is a method of manufacturing an automobile capable of automatic driving while recognizing and following a vehicle ahead. For example, this method is a manufacturing method of an automobile having a cruise control function, a lane departure warning function, an automatic driving function, etc.

Automobile Manufacturing Method

As shown in FIG. 1 and FIG. 2, the automobile manufacturing method according to the first embodiment includes a first installation step (step ST1), a second installation step (step ST2), and an inspection step (step ST3).

First, as shown in FIG. 1 and FIG. 2, in the first installation step (step ST1), parts for making a target vehicle-being-manufactured capable of automatic driving are installed in a body B. As shown in FIG. 2, before these parts are installed, for example, doors are removed from the body B. The body B is transferred from a coating step, for example.

As will be described in detail later, the parts may be assembled into a module in advance and collectively installed. Alternatively, the parts may be sequentially installed while the body B is transferred by a conveyor or the like. A target vehicle-being-manufactured V1 in the first installation step shown in FIG. 2 has a monocoque structure, but may instead have a frame structure.

Figure 3:
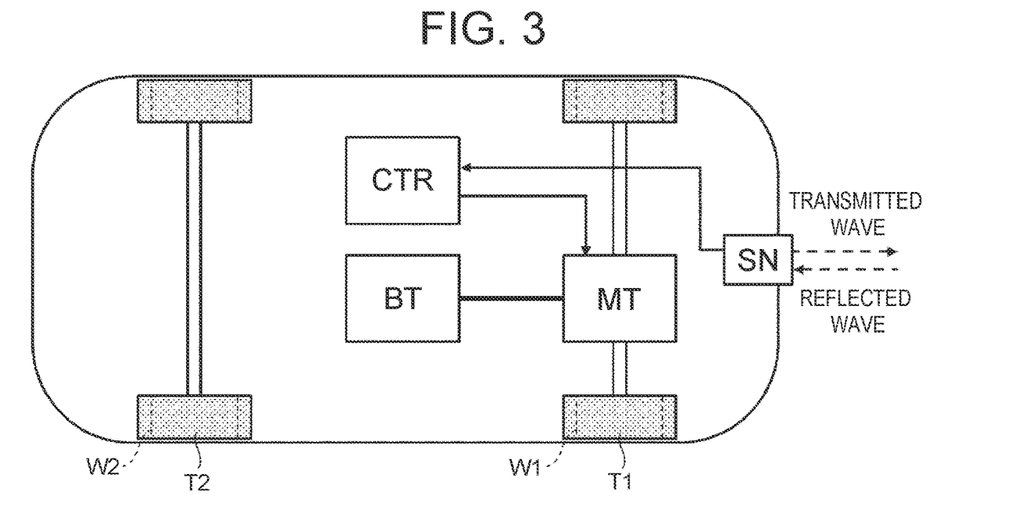
FIG. 3 is a schematic plan view showing a target vehicle-being-manufactured in which parts for making the target vehicle-being-manufactured capable of automatic driving have been installed in a first installation step (step ST1)

FIG. 3 is a schematic plan view showing a target vehicle-being-manufactured in which the parts for making the vehicle capable of automatic driving have been installed in the first installation step (step ST1). As shown in FIG. 3, in the first installation step (step ST1), traveling parts including tires T1, T2 and wheels W1, W2, a motor MT, a battery BT, a sensor SN, and a controller CTR are installed.

The parts installed in the first installation step (step ST1) will be described in more detail. As shown in FIG. 3, the tire T1 is mounted on the front wheel W1, and the tire T2 is mounted on the rear wheel W2. The traveling parts include, for example, a suspension, a steering device, a brake device, and others that are not shown in FIG. 3.

The motor MT is a drive source that drives the wheel W1 through a transmission (not shown). The drive source may instead be an engine, such as a gasoline engine or a diesel engine. The drive source may drive the wheel W2 or both the wheels W1, W2. The battery BT is a power supply device that supplies a power source (electricity) to the motor MT. The battery BT may be a secondary battery, such as a lithium-ion battery, or a fuel cell. When the drive source is an engine, a fuel tank that stores gasoline or light oil and supplies the fuel to the engine corresponds to the power supply device.

Thus, the target vehicle-being-manufactured in the automobile manufacturing method according to this embodiment is not limited to an electric vehicle, a hybrid vehicle, a fuel-cell vehicle, and the like that can be driven by a motor, but may also be an engine vehicle that can be driven by an engine, and there may be these different types of vehicles on the manufacturing line. However, an engine vehicle emits exhaust gas during automatic following driving in the second installation step (step ST2) to be described later. Therefore, for example, an exhaust gas removing device is required. On the other hand, an automobile that can be driven by a motor does not emit exhaust gas and can eliminate the need for an exhaust gas removing device, which translates into a further reduction in the manufacturing facility cost.

The sensor SN recognizes a vehicle ahead, and for example, is a millimeter-wave sensor. As shown in FIG. 3, the sensor SN recognizes a vehicle ahead by transmitting waves to a vehicle ahead and detecting waves reflecting off the vehicle ahead. The controller CTR controls the motor MT etc. based on information (reflected waves) acquired from the sensor SN such that the target vehicle-being-manufactured runs so as to follow the vehicle ahead while keeping a constant inter-vehicle distance.

Next, as shown in FIG. 1 and FIG. 2, in the second installation step (step ST2), interior parts are sequentially installed in a target vehicle-being-manufactured V2 while the target vehicle-being-manufactured V2 is moved by automatic driving so as to follow a vehicle-being-manufactured (not shown) ahead of and adjacent to the target vehicle-being-manufactured V2. In FIG. 2, the target vehicle-being-manufactured V2 is located at a start of a line for the second installation step, and a target vehicle-being-manufactured V3 is located at an end of the line. Thus, the target vehicle-being-manufactured V2 is a vehicle-being-manufactured that has just transitioned from the first installation step to the second installation step. The target vehicle-being-manufactured V3 is a vehicle-being-manufactured that is about to transition from the second installation step to the inspection step.

Here, the controller CTR installed in the target vehicle-being-manufactured V1, for example, in the first installation step (step ST1) is set to an automatic following driving mode at the time of transition from the first installation step (step ST1) to the second installation step (step ST2). Thus, the target vehicle-being-manufactured V1 can be moved to the line for the second installation step so as to follow the target vehicle-being-manufactured V2.

When the target vehicle-being-manufactured V1 is located at the front of the line and has no vehicle-being-manufactured to follow that is running ahead thereof, an AGV may instead run ahead of and lead the target vehicle-being-manufactured V1. For example, this AGV has a jig mounted thereon that allows the target vehicle-being-manufactured V1 to recognize the AGV as a vehicle.

In the second installation step (step ST2), interior parts, for example, a package tray, a carpet, a console, a roof side inner garnish, a front seat, a rear seat, and a door are installed in this order. In the second installation step, for example, a bumper may be further installed after these interior parts are installed. The later the bumper is installed, the less likely the bumper is to get scratches on the surface.

As shown in FIG. 1 and FIG. 2, in the inspection step (step ST3), a completed vehicle V4 of the target vehicle-being-manufactured is inspected. As shown in FIG. 2, for example, the automatic following driving mode is canceled and switched to manual driving in the inspection step. Thus, in the inspection step, the automatic following driving mode is stopped and a worker drives the completed vehicle V4 to move the completed vehicle V4. After the completed vehicle V4 has been moved into the inspection step, the automatic following driving mode of the target vehicle-being-manufactured V3 is stopped to follow suit. Thus, vehicles do not follow another vehicle ahead in the inspection step, which allows freedom in inspecting the traveling function etc.

The automatic following driving mode of the controller CTR may include a manufacturing mode (a first mode) in which a target vehicle-being-manufactured is controlled so as to follow a vehicle-being-manufactured ahead in the second installation step, and a product mode (a second mode) in which a completed vehicle is controlled so as to follow a vehicle ahead on the road. For example, in the manufacturing mode, automatic following driving is performed by acquiring information only from the sensor SN, while in the product mode, automatic following driving is performed by acquiring information not only from the sensor SN but also from other sensors including a camera. Therefore, the amount of information acquired from sensors is smaller in the manufacturing mode than in the product mode. Thus, the amount of work such as calibration of sensors can be reduced.

For example, transition to the manufacturing mode is prohibited and the prohibited state is maintained from a point in time after the second installation step and before shipment of a completed vehicle. For example, transition to the manufacturing mode is prohibited and the prohibited state is maintained from a point in time during the inspection step. Thus, a shipped vehicle can be reliably prevented from transitioning to the manufacturing mode while running on the road. In this case, transition to the manufacturing mode may be prohibited and the prohibited state may be maintained when the amount of operation of at least one of a steering wheel, an accelerator pedal, and a brake pedal has exceeded a predetermined reference value. Thus, transition to the manufacturing mode can be easily prevented.

As has been described above, the automobile manufacturing method according to the first embodiment involves, in the second installation step, sequentially installing the interior parts in the target vehicle-being-manufactured while moving the target vehicle-being-manufactured by automatic driving so as to follow a vehicle-being-manufactured ahead of and adjacent to the target vehicle-being-manufactured. Thus, the need for a conveyor or a trolley used to transfer a vehicle-being-manufactured on the line for the second installation step can be eliminated, which translates into a reduction in the manufacturing facility cost.

Figure 4:
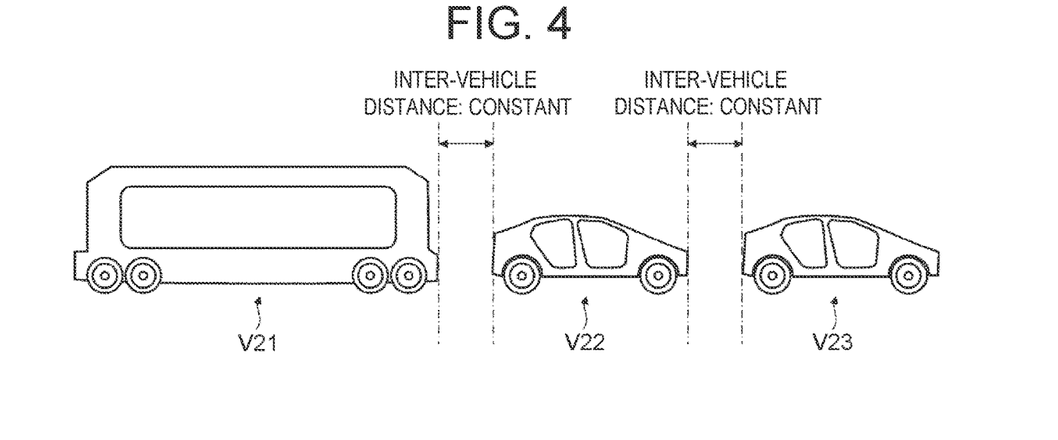
FIG. 4 is a schematic side view showing a second installation step (step ST2)
Figure 5:
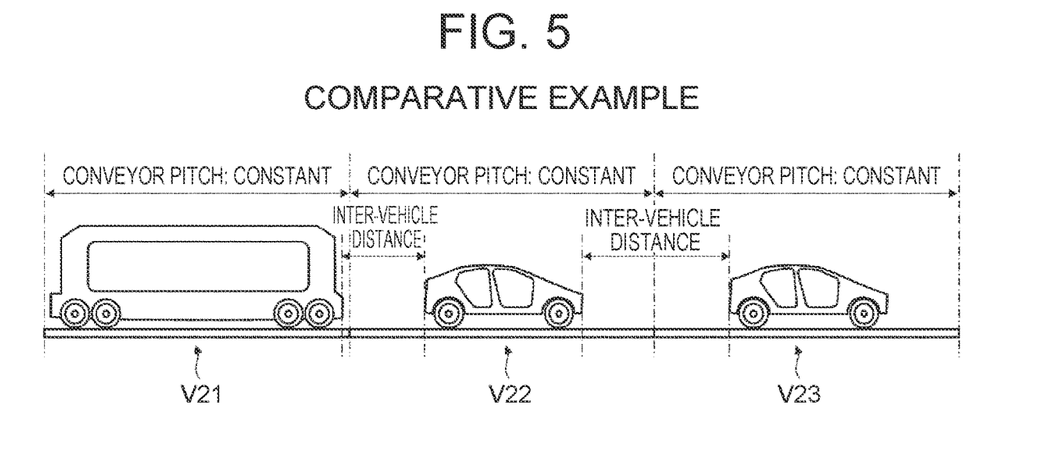
FIG. 5 is a schematic side view showing an interior parts installation step according to a comparative example.

FIG. 4 is a schematic side view showing the second installation step (step ST2). On the other hand, FIG. 5 is a schematic side view showing an interior parts installation step according to a comparative example. FIG. 4 and FIG. 5 each show a state where there are a large-sized vehicle V21 and medium-sized vehicles V22, V23 on a line for the installation step. In FIG. 4 and FIG. 5, the medium-sized vehicle V22 follows the medium-sized vehicle V23, and the large-sized vehicle V21 follows the medium-sized vehicle V22. For example, the large-sized vehicle V21 has a frame structure.

In this case, in the comparative example, the conveyor pitch is constant and determined by the length of the large-sized vehicle V21, which makes the inter-vehicle distance long and non-uniform as shown in FIG. 5. By contrast, in the second installation step according to this embodiment, the inter-vehicle distance can be kept constant regardless of the lengths of vehicles-being-manufactured as shown in FIG. 4, and therefore the production efficiency is higher than in the comparative example. In other words, the automobile manufacturing method according to this embodiment can be said to be suitable for a production line on which there are vehicles with different lengths.

Details of First Installation Step

Figure 6:
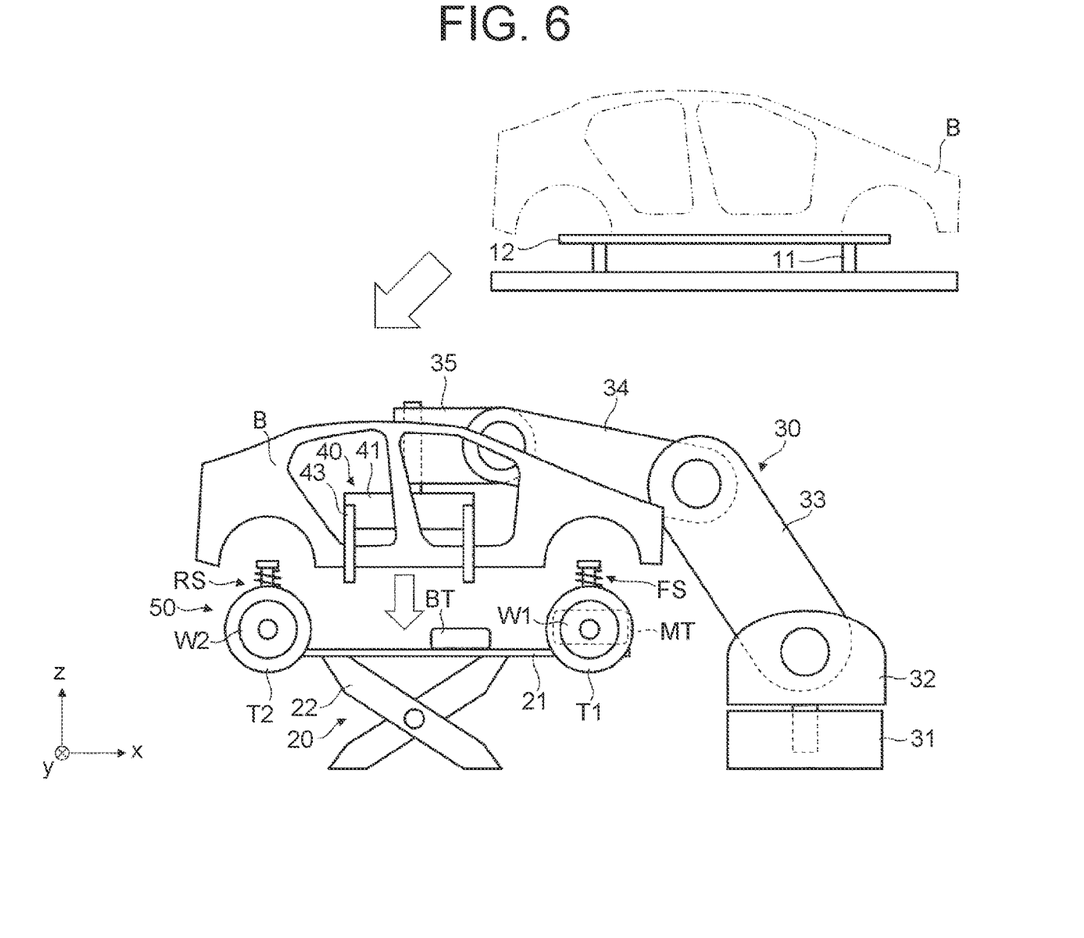
FIG. 6 is a schematic side view showing an example of the first installation step (step ST1)

Next, an example of the first installation step (step ST1) will be described with reference to FIG. 6. FIG. 6 is a schematic side view showing an example of the first installation step (step ST1). It should be understood that the right-handed Cartesian xyz-coordinate system shown in FIG. 6 is merely for the convenience of illustrating the positional relationship of the components. Normally, a positive direction along a z-axis is an upward direction and an xy-plane is a horizontal plane, which applies to all the drawings.

As shown in FIG. 6, in the first installation step, the parts for making a vehicle capable of automatic driving are assembled into a module in advance. After the body B is placed on a module 50, parts are installed in the body B. As shown in FIG. 6, the module 50 includes the traveling parts, the motor MT, and the battery BT. The module 50 further includes the sensor SN and the controller CTR shown in FIG. 3. The traveling parts include the tires T1, T2, the wheels W1, W2, a front suspension FS, and a rear suspension RS. The rear suspension RS may be of a type in which a spring and a shock absorber are placed side by side.

The first installation step will be described in detail below. First, as shown in FIG. 6, the body B before the module 50 is installed therein is placed on a coating trolley 12 that travels on rails 11 provided so as to extend in a y-axis direction, for example, and the body B is transferred in a positive direction along a y-axis from the near side in FIG. 6, for example. A line on which the body B before the module 50 is installed therein is transferred is a coating line, for example. This means that the module 50 is installed in the body B that has been coated.

In the example of FIG. 6, the module 50 is supported on a supporting frame 21 of a raising-lowering device 20. For example, the module 50 assembled on a negative side in the y-axis direction relative to the raising-lowering device 20 is transferred toward a positive side in the y-axis direction and placed on the raising-lowering device 20. The supporting frame 21 is supported on legs 22. The legs 22 are formed by a pair of columns that are crossed in an X-shape and turnably coupled together. The supporting frame 21 can be raised and lowered by the legs 22 thus configured.

As shown in FIG. 6, the body B is grasped and carried from the coating line by a grasping part 40 of a robot arm 30, and the body B is placed on the module 50 supported on the supporting frame 21 of the raising-lowering device 20. Here, the coating line including the rails 11 and the coating trolley 12 is provided at a higher position than an installation line on which the module 50 is installed in the body B. Thus, the body B is carried from a higher position to a lower position, so that the body B can be carried by a small amount of energy. The configuration of the robot arm 30 will be described in detail later.

Then, the module 50 is installed in the body B placed on the module 50, from under the body B by screw fastening etc. For example, a plurality of parts composing the module 50 is collectively installed in the body B by a plurality of fastening robots (not shown) provided on both sides of the raising-lowering device 20 in a width direction (y-axis direction). Instead of the fastening robots, a plurality of workers may collectively install the parts in the body B. Then, in the example of FIG. 6, the target vehicle-being-manufactured in which the module 50 has been installed is lowered onto a floor by the raising-lowering device 20 and moved by automatic following driving in a positive direction along an x-axis.

When the parts are thus assembled into a module and collectively installed in the body B, the time required for installation can be reduced compared with when the parts are sequentially installed while the body B is transferred. Moreover, the need for a conveyor on which the body B is transferred in a suspended or lifted posture can be eliminated, and the line for the first installation step itself can be omitted.

Configuration of Robot Arm 30

Figure 7:
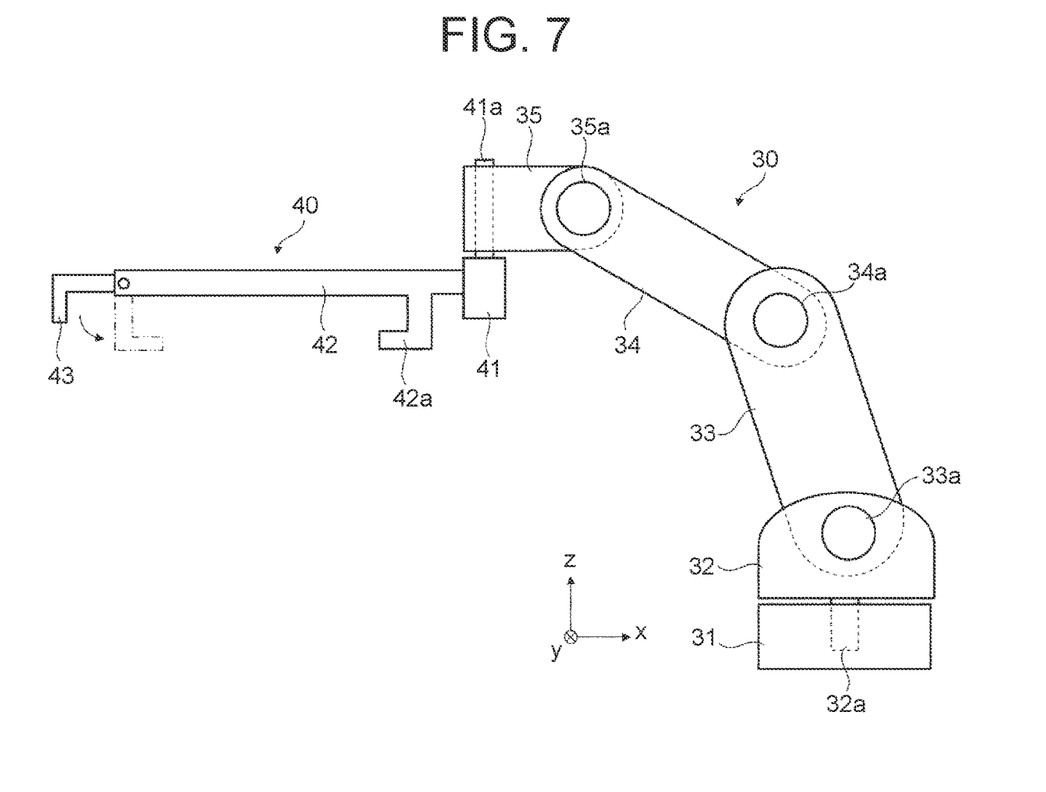
FIG. 7 is a schematic side view showing an example of a robot arm for carrying a body that is used in the first installation step (step ST1)

Next, the robot arm 30 will be described in detail with reference to FIG. 7 in addition to FIG. 6. FIG. 7 is a schematic side view showing an example of the robot arm for carrying a body that is used in the first installation step (step ST1).

The robot arm 30 is a body carrying device that carries the body B. As shown in FIG. 7, the robot arm 30 is an articulated robot arm having a base 31, a link root 32, a first link 33, a second link 34, a third link 35, and the grasping part 40. The link root 32 is coupled to the base 31 through a rotating shaft 32a so as to be able to rotate around the rotating shaft 32a. The rotating shaft 32a of the link root 32 is a shaft parallel to the z-axis. The link root 32 is driven to rotate by a motor etc. (not shown).

The first link 33 is turnably coupled to the link root 32 through a first joint 33a provided at a base end of the first link 33. The second link 34 is turnably coupled to a leading end of the first link 33 through a second joint 34a provided at a base end of the second link 34. Here, rotating shafts of the first joint 33a and the second joint 34a are shafts parallel to the y-axis in the state shown in FIG. 6 and FIG. 7. The height of the grasping part 40 can be changed by turning the first link 33 and the second link 34. The first link 33 and the second link 34 are each driven to rotate by a motor etc. (not shown).

The third link 35 is turnably coupled to a leading end of the second link 34 through a third joint 35a provided at a base end of the third link 35. Here, a rotating shaft of the third joint 35a is a shaft parallel to the y-axis in the state shown in FIG. 6 and FIG. 7. The grasping part 40 is turnably coupled to a leading end of the third link 35 through a rotating shaft 41a. To carry the body B, the grasping part 40 grasping the body B is maintained in a substantially horizontal posture, so that the third link 35 is also maintained in a substantially horizontal posture. The third link 35 is driven to rotate by a motor etc. (not shown).

The grasping part 40 includes a base 41, forks 42, and front hooks 43. FIG. 7 is a side view of the grasping part 40, and FIG. 6 is a front view of the grasping part 40 grasping the body B. As shown in FIG. 6, the rotating shaft 41a extending in a vertical direction (z-axis direction) is provided at a center portion of an upper surface of the base 41, and the grasping part 40 can rotate around the rotating shaft 41a as an axis. The grasping part 40 is driven to rotate by a motor etc. (not shown).

As shown in FIG. 6 and FIG. 7, two forks 42 are provided so as to extend parallel to each other from the base 41 in a substantially horizontal direction, and the L-shaped front hook 43 is turnably coupled to a leading end of each of the two forks 42. In addition, as shown in FIG. 7, an L-shaped rear hook 42a is provided on each fork 42, at a side closer to the base 41. The front hooks 43 are driven to rotate by a motor etc. (not shown).

When the grasping part 40 grasps the body B, the front hooks 43 are turned downward from the state indicated by the solid line to the state indicated by the long dashed-double short dashed line in FIG. 7. Specifically, as shown in FIG. 6, for example, the forks 42 are inserted through door panel openings provided on both sides of the body B, and then the body B is grasped at a bottom by the front hooks 43 having been turned downward and the rear hooks 42a. The body B can be easily grasped by inserting the forks 42 through the door panel openings. Moreover, since the body B is grasped at the bottom that does not easily deform, deformation of the body B while being carried can be reduced. The grasping part 40 may be configured to be able to tilt on an axis along a longitudinal direction of the fork 42 (the x-axis direction in FIG. 7).

The carrying device that carries the body B is not limited to the robot arm 30 but may instead be a hanger, a forklift, or another carrying device. However, the body B can be carried to an accurate position in the module 50 in a short time by grasping and carrying the body B by the robot arm 30.

Details of Inspection Step

Figure 8:
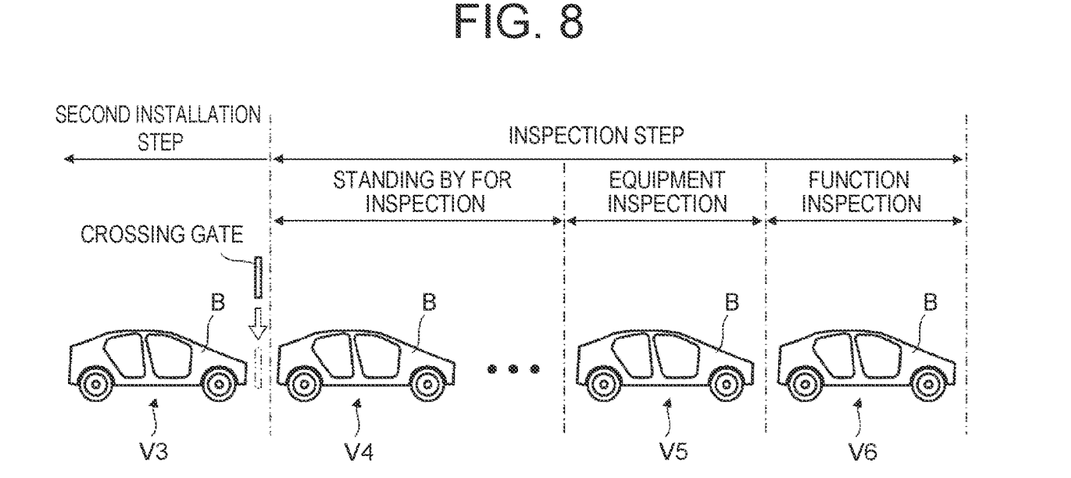
FIG. 8 is a schematic side view showing details of an inspection step (step ST3)

Next, the inspection step will be described in detail with reference to FIG. 8. FIG. 8 is a schematic side view showing the details of the inspection step (step ST3). As shown in FIG. 8, in the inspection step, an equipment inspection and a function inspection are performed in this order.

In FIG. 8, the equipment inspection is being performed on a completed vehicle V5, and the function inspection is being performed on a completed vehicle V6. The completed vehicle V4 is standing by for inspection. There may be a plurality of completed vehicles standing by for inspection. In the equipment inspection, inspection is performed on the state of the parts installed in the first installation step and the second installation step and on the external appearance of the completed vehicle. In the function inspection, inspection is performed on the brake, wheel alignment, headlights, fixed-position running, etc.

In this embodiment, for example, when a defect occurs in the target vehicle-being-manufactured V3 in the course of the second installation step, the target vehicle-being-manufactured V3 is continuously moved to the inspection step by automatic driving. Before the target vehicle-being-manufactured V3 is inspected, the target vehicle-being-manufactured V3 is moved out of the line for the inspection step by manual driving.

If the target vehicle-being-manufactured V3 is moved out of the line for the second installation step during the second installation step, a vehicle-being-manufactured behind the target vehicle-being-manufactured V3 will also move out of the line for the second installation step by following the target vehicle-being-manufactured V3. However, if the target vehicle-being-manufactured V3 is moved out of the line for the inspection step during the inspection step in which vehicles are moved by manual driving, the vehicle-being-manufactured behind the target vehicle-being-manufactured V3 can be prevented from moving out of the line for the inspection step by following the target vehicle-being-manufactured V3.

In this embodiment, when it is necessary to stop the line for the second installation step, the target vehicle-being-manufactured V3 located at the end of the line for the second installation step is stopped by a crossing gate provided at the end as shown in FIG. 8. Thus, it is possible to stop the entire line for the second installation step without stopping the inspection step, as well as to easily resume automatic following driving in the second installation step. Operation of the line for the second installation step can be resumed, for example, by moving the target vehicle-being-manufactured V3 located at the end to the inspection step by manual driving. Alternatively, the automatic following driving mode may be set as such a mode that when there is no obstacle in front of the vehicle, the vehicle travels straight forward.

Layout of Factory

Figure 9:
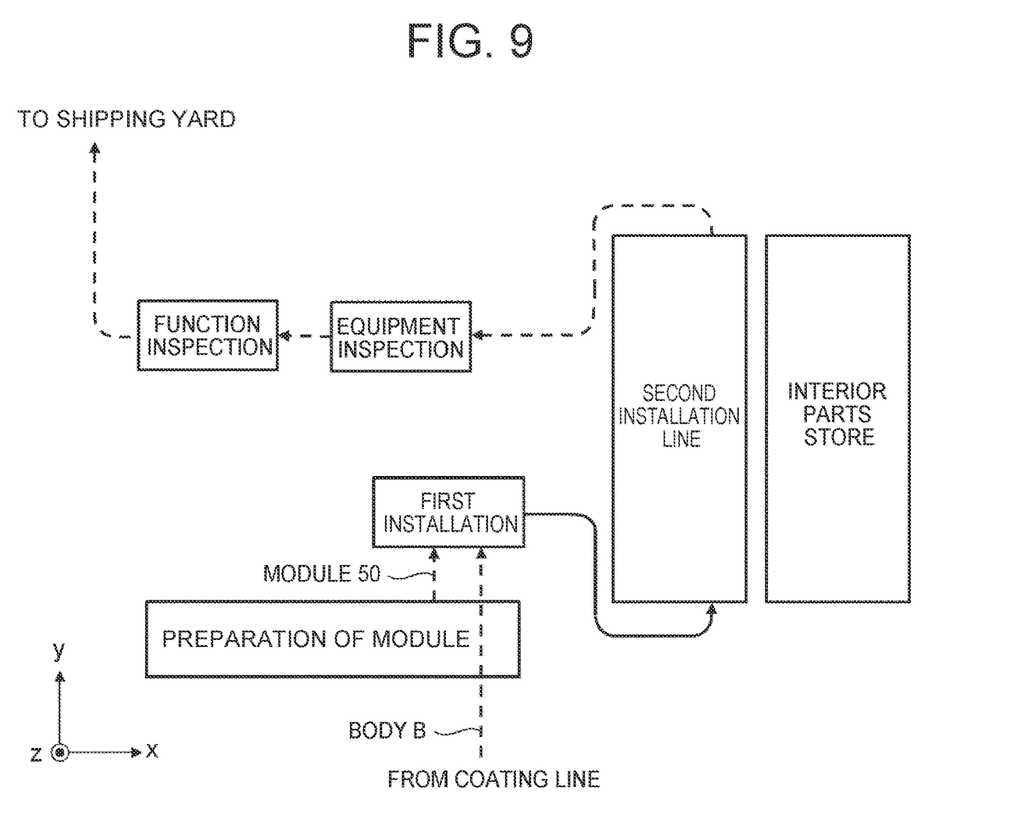
FIG. 9 is a schematic plan view showing an example of the layout of a factory.

Next, an example of the layout of a factory will be described with reference to FIG. 9. FIG. 9 is a schematic plan view showing an example of the layout of the factory. In the example of FIG. 9, a module preparation area in which the parts for making a vehicle capable of automatic driving are assembled into a module in advance is provided so as to extend in the x-axis direction. As indicated by the dashed arrow in FIG. 9, the module 50 assembled in the module preparation area is transferred to a first installation area.

Meanwhile, as indicated by the dashed arrow in FIG. 9, the body B is transferred from the coating line to the first installation area. Then, in the first installation area, the module 50 is installed in the body B. As indicated by the solid arrow in FIG. 9, the target vehicle-being-manufactured is moved by automatic following driving from the first installation area to the second installation line.

In the example of FIG. 9, the second installation line on which the interior parts are installed is provided on a positive side in the x-axis direction relative to the first installation area, so as to extend in the y-axis direction and parallel to an interior parts store. In the second installation step, the interior parts are sequentially installed in the target vehicle-being-manufactured while the target vehicle-being-manufactured is moved by automatic following driving. Since the second installation line is provided so as to extend parallel to the interior parts store, the distance over which the interior parts are moved from the interior parts store to the second installation line can be shortened. As indicated by the dashed arrow in FIG. 9, the target vehicle-being-manufactured is moved by manual driving after the interior parts are installed therein.

In the example of FIG. 9, an equipment inspection area and a function inspection area are provided side by side in the x-axis direction. Thus, an inspection area including the equipment inspection area and the function inspection area is provided opposite to the module preparation area so as to extend in the x-axis direction. The target vehicle-being-manufactured with the interior parts installed therein undergoes the equipment inspection and the function inspection, and then is housed in a shipping yard.

Thus, in the layout shown in FIG. 9, the first installation area and the module preparation area, the second installation line, and the inspection area including the equipment inspection area and the function inspection area are continuously disposed in a U-shape (specifically, in a U-shape turned 90° in a counterclockwise direction). Thus, the layout can be made compact.

Second Embodiment

Figure 10:
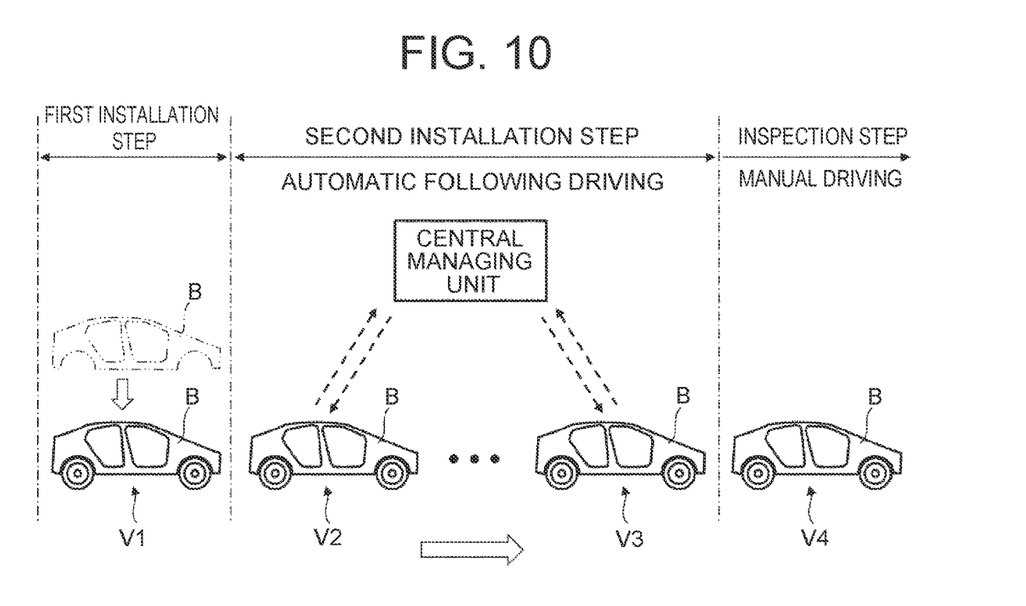
FIG. 10 is a schematic side view showing an automobile manufacturing method according to a second embodiment.

Next, an automobile manufacturing method according to a second embodiment will be described with reference to FIG. 10. FIG. 10 is a schematic side view showing the automobile manufacturing method according to the second embodiment, and is a view corresponding to FIG. 2.

As shown in FIG. 10, in the automobile manufacturing method according to the second embodiment, a central managing unit that centrally manages the movement of vehicles-being-manufactured is further provided. During the process of moving the vehicles-being-manufactured by automatic following driving in the second installation step, the central managing unit can control the movement of each vehicle-being-manufactured by performing wireless communication with the vehicle-being-manufactured. For example, in the event of an emergency, control by the central managing unit takes priority over control by the controller CTR of each vehicle-being-manufactured. In the automobile manufacturing method according to this embodiment, instead of the crossing gate shown in FIG. 8, the central managing unit may stop the target vehicle-being-manufactured V3 located at the end.

The present disclosure is not limited to the above embodiments but can be modified as appropriate within the scope of the gist of the disclosure.

What is claimed is:

1. A method of manufacturing an automobile capable of automatic driving while recognizing and following a vehicle ahead, the method comprising:
   a first installation step of installing traveling parts, a drive source, a power supply device, a sensor, and a controller in a target vehicle-being-manufactured to make the target vehicle-being-manufactured capable of automatic driving, the traveling parts including a tire and a wheel, the drive source driving the wheel, the power supply device supplying a power source for operating the drive source, the sensor recognizing the vehicle ahead, a controller controlling the drive source based on information acquired from the sensor such that the target vehicle-being-manufactured runs so as to follow the vehicle ahead; and
   a second installation step of, after the first installation step, installing an interior part in the target vehicle-being-manufactured while moving the target vehicle-being-manufactured by automatic driving so as to follow a vehicle-being-manufactured ahead of and adjacent to the target vehicle-being-manufactured.

2. The automobile manufacturing method according to claim 1, further comprising a step of moving the target vehicle-being-manufactured by manual driving after the second installation step.

3. The automobile manufacturing method according to claim 1, further comprising an inspection step of inspecting a completed vehicle of the target vehicle-being-manufactured after the second installation step.

4. The automobile manufacturing method according to claim 3, wherein the target vehicle-being-manufactured is moved by manual driving in the inspection step, and when a defect occurs in the target vehicle-being-manufactured during the second installation step, the target vehicle-being-manufactured is continuously moved to the inspection step by automatic driving, and then the target vehicle-being-manufactured is moved out of a line for the inspection step by manual driving before being inspected.

5. The automobile manufacturing method according to claim 3, wherein:
   the controller has a plurality of automatic following driving modes including a first mode in which the target vehicle-being-manufactured is controlled so as to follow the vehicle-being-manufactured in the second installation step, and a second mode in which the completed vehicle is controlled so as to follow the vehicle ahead; and
   the controller prohibits transition to the first mode and maintains a prohibited state in which the transition to the first mode is prohibited, from a point in time after the second installation step and before shipment of the completed vehicle.

6. The automobile manufacturing method according to claim 5, wherein the controller prohibits the transition to the first mode and maintains the prohibited state from a point in time during the inspection step.

7. The automobile manufacturing method according to claim 1, wherein:
   the controller has a plurality of automatic following driving modes including a first mode in which the target vehicle-being-manufactured is controlled so as to follow the vehicle-being-manufactured in the second installation step, and a second mode in which a completed vehicle is controlled so as to follow the vehicle ahead; and
   the controller prohibits transition to the first mode and maintains a prohibited state in which the transition to the first mode is prohibited, from a point in time after the second installation step and before shipment of the completed vehicle.

8. The automobile manufacturing method according to claim 7, wherein the controller prohibits the transition to the first mode and maintains the prohibited state when an amount of operation of at least one of a steering wheel, an accelerator pedal, and a brake pedal has exceeded a reference value.

9. The automobile manufacturing method according to claim 7, wherein an amount of information acquired from the sensor is smaller in the first mode than in the second mode.

10. The automobile manufacturing method according to claim 1, wherein, to stop an operation for the second installation step, a vehicle-being-manufactured located at an end of a line for the second installation step is stopped by a crossing gate provided at the end of the line for the second installation step.

11. The automobile manufacturing method according to claim 1, wherein the traveling parts, the drive source, the power supply device, the sensor, and the controller to be installed in the target vehicle-being-manufactured in the first installation step are assembled into a module in advance.

12. The automobile manufacturing method according to claim 1, wherein the drive source is a motor and the power supply device is a battery.

13. The automobile manufacturing method according to claim 1, wherein, in the second installation step, a central managing unit controls movement of the vehicle-being-manufactured by performing wireless communication with the vehicle-being-manufactured.

* * * * *